United States Patent [19]

Takahira et al.

[11] Patent Number: 5,191,192
[45] Date of Patent: Mar. 2, 1993

[54] NON-CONTACT TYPE INFORMATION CARD AND COMMUNICATION SYSTEM

[75] Inventors: Kenichi Takahira; Kazuo Asami, both of Itami, Japan

[73] Assignee: Mitsubishi Denki Kabushiki Kaisha, Tokyo, Japan

[21] Appl. No.: 756,428

[22] Filed: Sep. 9, 1991

[30] Foreign Application Priority Data

Sep. 10, 1990 [JP] Japan .................................. 2-239396
Mar. 6, 1991 [JP] Japan .................................. 3-39785

[51] Int. Cl.$^5$ ............................................. G06K 7/10
[52] U.S. Cl. ................................... 235/375; 235/377; 235/380; 235/382; 235/492
[58] Field of Search ............... 235/375, 377, 380, 382, 235/436, 492

[56] References Cited

U.S. PATENT DOCUMENTS

4,501,958  2/1985  Glize et al. ........................... 235/380
4,538,056  8/1985  Young et al. ......................... 235/377
4,780,602  10/1988  Kawang et al. ...................... 235/380
5,068,521  11/1991  Yamaguchi ........................... 235/492

Primary Examiner—William L. Sikes
Assistant Examiner—Scott A. Ouellette
Attorney, Agent, or Firm—Leydig, Voit & Mayer

[57] ABSTRACT

A non-contact type information card includes a modulating/demodulating circuit, an antenna circuit, a CPU, a RAM, and a clock signal generating circuit. In the non-contact type information card, when the modulating/demodulating circuit receives a new command signal, the CPU determines whether first and second identification information in the new command signal agrees with the first and second identification information in an old command signal. When the first and second identification information of the new command signal agree with that of the old command signal, the CPU stops the operation of the clock generating circuit until the next command signal is received.

12 Claims, 11 Drawing Sheets

| 7 6 5 | 4 3 2 1 0 |
|---|---|
| GATE CODE | SERIAL NUMBER |

FIG. 10

| PROCESS CODE | CONTENT |
|---|---|
| 01 | INGRESS |
| 02 | EGRESS |
| 03 | SHOPPING |
| 04 | PENEWAL OF BALANCE |
| ⋮ | ⋮ |
| ⋮ | ⋮ |
| 99 | ISSUE |

NON-CONTACT TYPE INFORMATION CARD AND COMMUNICATION SYSTEM

BACKGROUND OF THE INVENTION

1. Field of the Invention

The present invention relates to a non-contact type information card for data communication with an external unit and a communication system using the same.

2. Description of the Related Art

Figure 14:
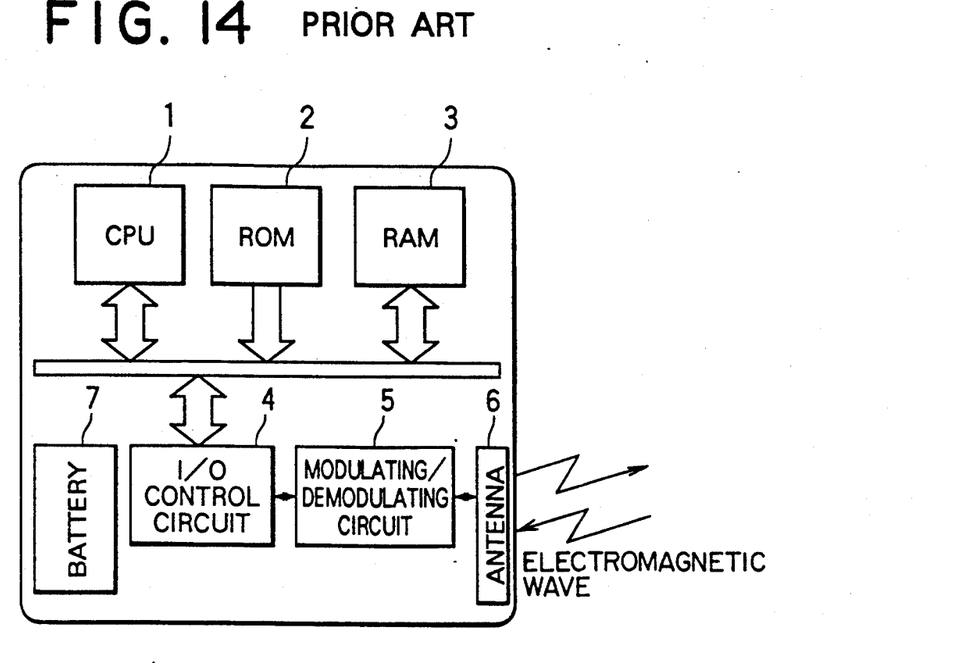
FIG. 14 is a block diagram showing the conventional non-contact type information card.

Of various types of information cards, information cards of a non-contact type have been utilized in recent years which employ a space transmitting medium, such as electromagnetic waves or light, to transmit and receive signals. FIG. 14 shows the structure of such a non-contact type information card. A ROM 2 and a RAM 3 are connected through a bus 8 to a CPU 1 controlling the operation of the information card. An input/output control circuit 4 (hereinafter referred to as an I/O control circuit 4) for controlling the input and output of data is connected to the bus 8. An antenna 6 is connected to the I/O control circuit 4 via a modulating-/demodulating circuit 5. The information card has a built-in battery 7 which supplies electricity to electric circuits.

In such an information card, when the antenna 6 receives a command signal in the form of an electromagnetic wave from an external unit, such as terminal equipment, the command signal is input to the CPU 1 through the I/O control circuit 4 after having been demodulated by the modulating/demodulating circuit 5. The CPU 1 deciphers the command signal, and then creates a predetermined response signal. The response signal is input via the I/O control circuit 4 to the modulating/demodulating circuit 5, which modulates it before the response signal is transmitted to the external unit through the antenna 6.

Figure 15:
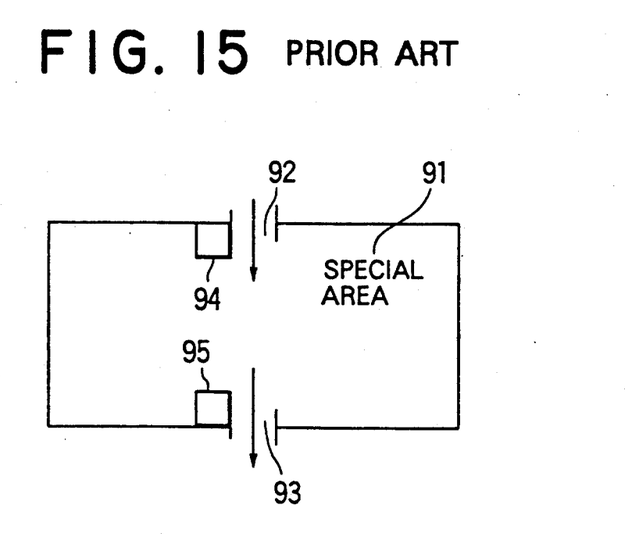
FIG. 15 is a view showing how the non-contact type information card is used.

Such an information card is used to control the ingress/egress of a special area 91, such as a partitioned room or a hall, as shown in FIG. 15. In the special area 91, there is an entrance gate 92 provided with entrance terminal equipment 94 and an exit gate 93 provided with exit terminal equipment 95. The entrance terminal equipment 94 constantly sends out at predetermined time intervals the command signal that includes a place code indicating the entrance gate 92 and a time code indicating when an information card holder passes the entrance gate 92. Similarly, the exit terminal equipment 95 constantly sends out at the predetermined time intervals the command signal that includes a place code indicating the exit gate 93 and a time code indicating when a card holder passes the exit gate 93. For this reason, every time card holders pass the entrance gate 92 or the exit gate 93, the place code and the time code are recorded onto the information card. By collecting the information cards, onto which the time and place codes are recorded, it is thus possible to control the ingress/egress of the special area 91, and to determine the number of entrances/exits made.

However, the entrance terminal equipment 94 installed at the entrance gate 92 and the exit terminal equipment 95 at the exit gate 93 regularly send out the command signal at the predetermined time intervals. Therefore, when an area around the gates becomes crowded and an information card holder stops in the zone where the command signal can be transmitted, the information card regularly continues to receive the command signal from the terminal equipment 94 or 95. Thus, every time the information card receives the command signal, it transmits the response signal. In this way, if the information card performs its operation a plurality of times with respect to only one passage through either gate, it becomes impossible to accurately control ingress/egress, and impossible to determine the number of entrances/exits made. In other words, it is required that the information card be limited to only one operation for each passage through either gate.

Several methods can be employed for limiting to only one operation for each passage, such as by moving the information card immediately outside the zone where the command signal can be transmitted; making the time intervals at which the terminal equipment transmits the command signal longer; and providing a period during which the information card restricts the reception of the command signal after it has transmitted the response signal.

These methods, however, limit the methods of carrying the information card, or cause a decrease in the processing speed when a large number of information cards are processed successively.

SUMMARY OF THE INVENTION

The present invention has been accomplished to solve the above problems. Accordingly, the object of the invention is to provide a non-contact type information card and a communication system accurately performing only one operation for each passage through a signal-transmissible zone of an external unit without limiting the method of carrying the card or causing a decrease in the processing speed.

In order to achieve the above object, according to one aspect of the present invention, there is provided a non-contact type information card comprising: data transmitting/receiving means for transmitting data to and receiving data from a plurality of external units in a non-contact manner; data processing means for processing data based on a command signals sequentially received by the data transmitting/receiving means, each command signal including first identification information identifying one of the external units and second identification information identifying time; storing means for storing the first and second identification information of a command signal, determining means for determining, when the data transmitting/receiving means receives a new command signal, whether the first and second identification information of the new command signal agree with the first and second identification information of the old command signal and stored in the storing means; stopping means for stopping, when the determining means determines that the first and second identification information of the new command signal agrees with the first and second identification information of the old command signal, the data processing means until the data transmitting/receiving means receives a next command signal; and updating means for updating, when the determining means determines that the first and second identification information of the new command signal do not agree with the first and second identification information of the old command signal, the storing means by storing the first and second identification information of the new command signal.

According to another aspect of the invention, there is provided a communication system comprising: a plurality of external units installable in different locations having respective signal-transmissible zones not interfering with each other for transmitting at predetermined time intervals command signals, each command signal including a time code and a place code identifying the location in which the respective external unit is installed; and a non-contact type information card for receiving the command signals from the plurality of external units, for processing data in response to a received command signal, when the non-contact type information card receiving the command signal from any one of the external units within the signal-transmissible zone of the respective external unit, comparing the time and place codes of the command signal received with time and place codes of a command signal received previously, and, when the new time and place codes agree with the old time and place codes, stopping the data processing until a next command signal is received.

DESCRIPTION OF THE PREFERRED EMBODIMENTS

The embodiments of the present invention will be described below with reference to the accompanying drawings.

Figure 1:
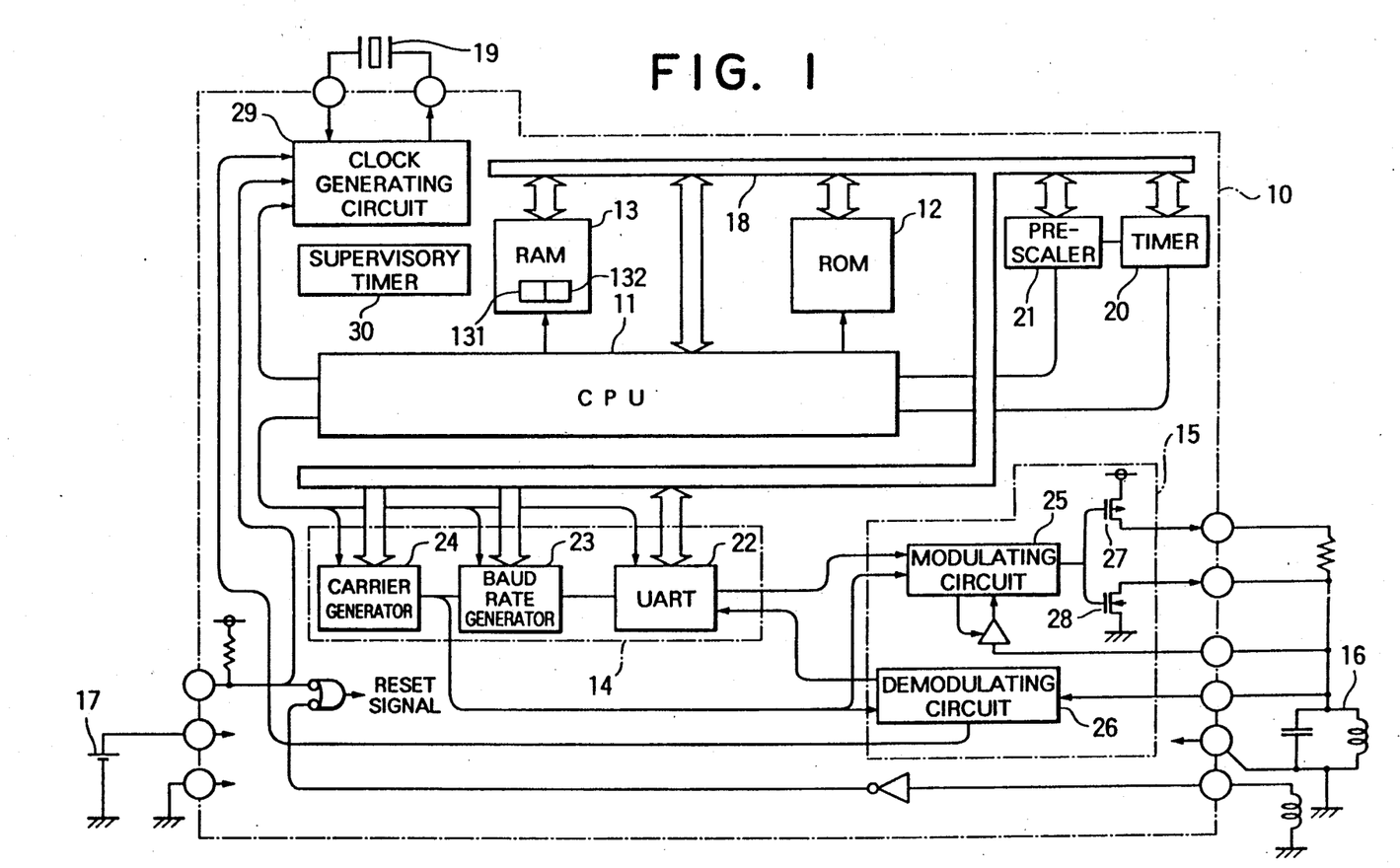
FIG. 1 is a block diagram showing an example of a non-contact type information card in accordance with the present invention.

FIG. 1 is a block diagram showing a non-contact type information card in accordance with a first embodiment of this invention. The information card has an IC 10 for controlling data communication. An antenna circuit 16, a battery 17 and a crystal resonator 19 are connected to the IC 10, which has a CPU 11 linked to a bus 18. A ROM 12, a RAM 13, and an I/O control circuit 14 are connected to the bus 18. The ROM 12 is used for storing a program controlling the operation of the CPU 11; the RAM 13 is used for storing data; and the I/O control circuit 14 is used for controlling the input/output of data sent to and from an external unit (not shown). A timer 20 for dividing an internal clock signal for counting and a prescaler 21 for setting the initial value of the timer 20 are connected to the bus 18. The RAM 13 stores in predetermined regions a place code 131, serving as first identification information, and a time code 132, serving as second identification information, both kinds of information being received from the external unit when data processing has been performed previously.

The I/O control circuit 14 is equipped with a UART 22 for transmitting serial asynchronous data, a baud rate generator 23 for setting the speed at which the UART 22 transmits data, and a carrier generator 24 for generating carriers. A modulating/demodulating circuit 15, to which the antenna circuit 16 is coupled, is connected to the I/O control circuit 14. The modulating/demodulating circuit 15 is provided with a modulating circuit 25 for modulating the output of the UART 22 based on the carrier, a demodulating circuit 26 for demodulating an input signal from the antenna circuit 16, and output transistors 27 and 28 for operating the antenna circuit 16.

A clock generating circuit 29 for feeding a clock signal to the circuits in the IC 10 is connected to the CPU 11 and the demodulating circuit 26 of the modulating/demodulating circuit 15. The clock generating circuit 29 is connected to the crystal resonator 19 outside the IC 10. Numeral 30 denotes a supervisory timer for monitoring excessive operation of the CPU 11.

Figure 2:
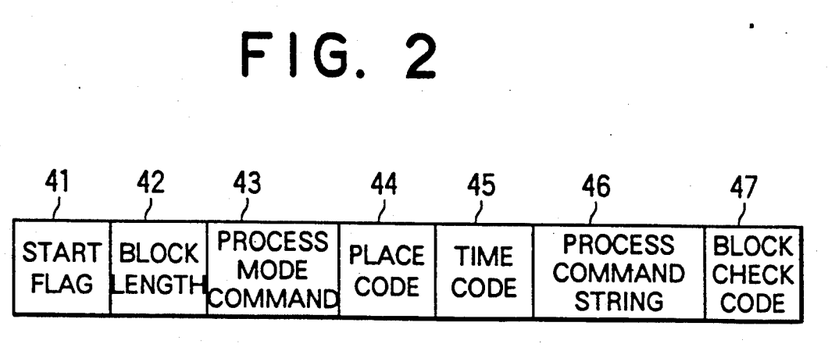
FIG. 2 is a view showing the data format of a command signal used in a first embodiment.

The information card is used for making a record of the ingress/egress of a special area as shown in FIG. 15. Together with external units arranged at entrance and exit gates to and from the special area, the information card constitutes a communication system in accordance with this invention. Each external unit sends out a trigger signal followed by a command signal at predetermined time intervals to the zone where the signals can be transmitted. FIG. 2 shows an example of the data format of the command signal sent by the external unit. The command signal has a start flag 41, a block length 42, a process mode command 43, a place code 44 serving as first identification information, a time code 45 serving as second identification information, a process command string 46 and a block check code 47. The process mode command 43 includes various modes, such as an issue mode for initializing an information card when it is issued, and a verification mode for verifying the recorded contents of an information card after it has been collected, in addition to a passage mode for making a record of ingress/egress of the special area.

The operation of the first embodiment will now be explained with reference to the flowchart of FIG. 3. First, the CPU 11 stands ready to output an STP command to the clock generating circuit 29 until it receives the trigger signal from the external unit, thereby stopping the internal clock signal from being generated. Once the trigger signal is sent out by the external unit, it is received by the antenna circuit 16 before being recognized by the demodulating circuit 26 of the modulating/demodulating circuit 15. A command is transmitted from the demodulating circuit 26 to the clock generating circuit 29, thus starting the clock generating circuit 29. The internal clock signal is supplied to various circuits in the IC 10.

Figure 3:
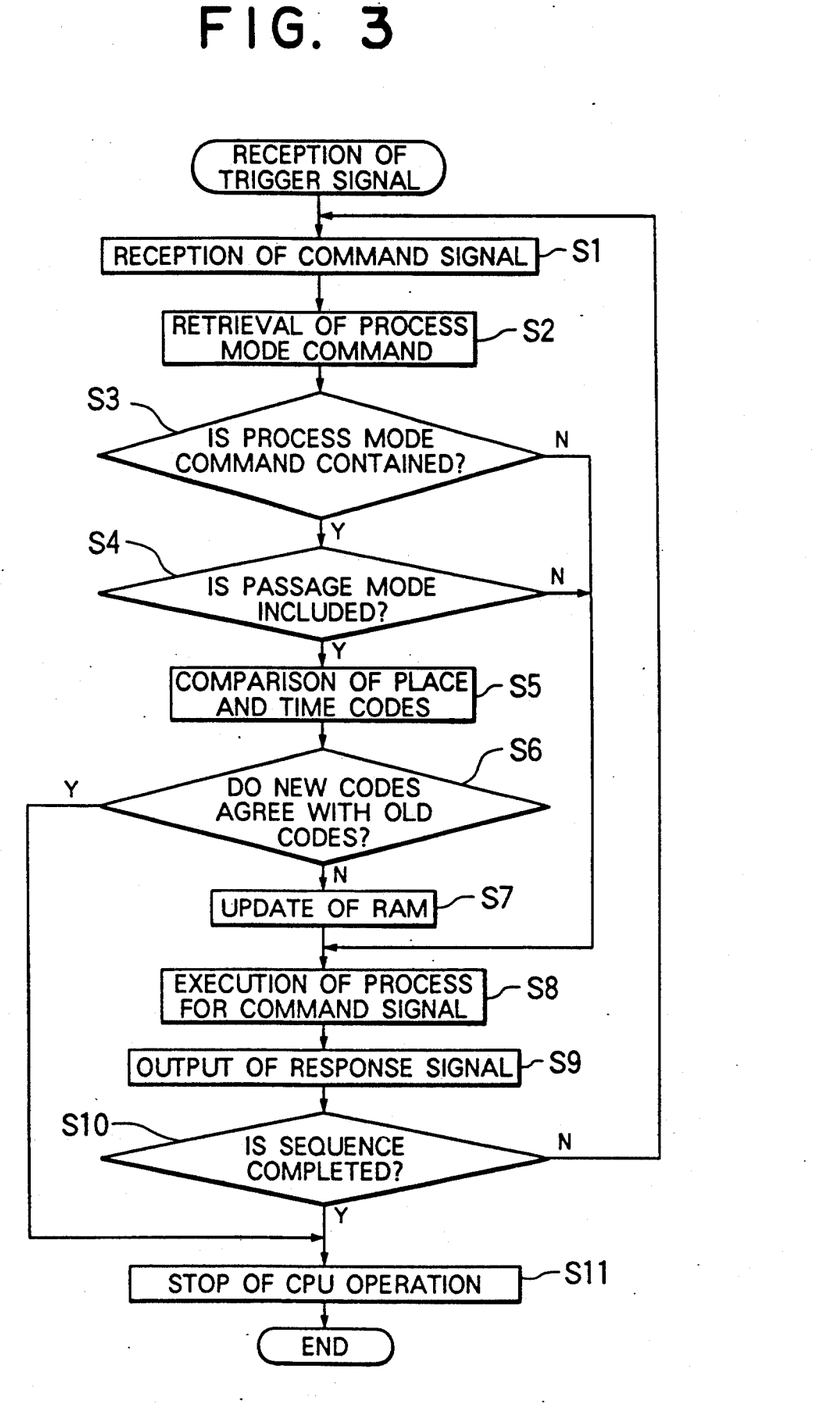
FIG. 3 is a flowchart showing the operation of the first embodiment.

When the internal clock is thus generated, the CPU 11 reads a program from the ROM 12, and processes data in accordance with the flowchart of FIG. 3. First, the CPU 11 receives the trigger signal followed by a command signal in step S1, and retrieves the process mode command 43 from the command signal in step S2. In step S3, if the process mode command 43 is contained in the command signal, a determination is made whether or not the process mode command 43 includes the passage mode in step S4. If the process mode command 43 includes the passage mode, then in step S5, the place code 44 and the time code 45, both contained in the command signal, are compared with the place code 131 and the time code 132, both stored in predetermined regions of the RAM 13 when the data has been processed previously. In this comparison, when a difference between the former time code 45 and the latter time code is not more than one unit of time, the former time code 45 is regarded as consistent with the latter time code. For instance, when the two time codes use minutes as the unit of time, a difference of not more than one minute is construed as being the same time. For this reason, even if there is a difference in time between the external units due to time lag and passage timing, both time codes are operated using the same timing when the old place and time codes are compared with the newly obtained place and time codes in step S5.

In step S6, a determination is made whether or not the contents of the place and time codes at a given time agree with those of the place and time codes at a previous time. If the new contents do not agree with the old contents, then in step S7, the values of the place code 131 and the time code 132 both stored in the RAM 13 are updated to the new place and time codes. In step S8, a process is then performed based on the process command string 46 contained in the command signal. In step S9, a response signal is output to the external unit. The process in steps S1 to S9 mentioned above is repeated until a determination is made that a sequence is completed in step S10. When the completion of the sequence is confirmed, the CPU 11 stops the operation of the clock generating circuit 29 in step S11, thus bringing the CPU 11 to a halt.

In step S6, if a determination is made that the contents of the new place and time codes agree with those of the old place and time codes, it is assumed that a card holder is standing near one gate of the special area. The process is not performed any longer for the subsequent process command string. The flow logically proceeds to step S11, where the operation of the CPU 11 is stopped. If a determination is made that the process mode command 43 is not contained in the command signal in step S3, or if the process mode command 43 does not include the passage mode in step S4, the flow logically proceeds to step S8, where the process is carried out based on the process command string 46.

Figure 4:
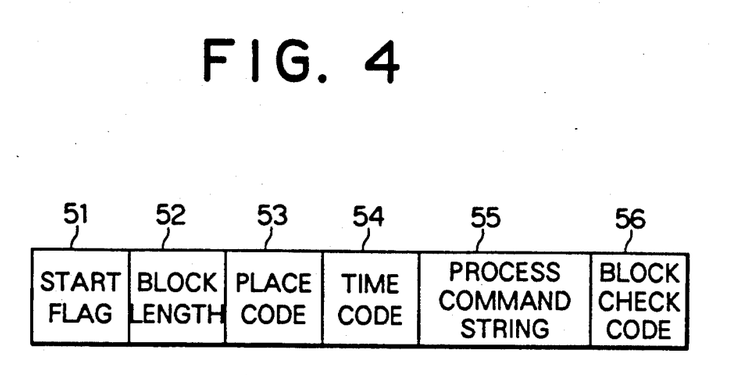
FIG. 4 is a view showing the data format of the command signal used in a second embodiment.

In the above embodiment, when ingress/egress is recorded in the form of the passage mode onto the information card, as shown in FIG. 2, the process mode command 43 specifying the passage mode is contained in the command signal transmitted by the external units. Every time the information card receives the command signal, it determines whether or not the passage mode is contained in the command signal. The information card, however, may be constructed in such a way that once the passage mode is set, it is maintained unless a mode setting command for specifying other modes is received. In such a case, a command signal having a data format as shown in FIG. 4 may be employed. This command signal is composed of a start flag 51, a block length 52, a place code 53, a time code 54, a process command string 55 and a block check code 56. As required, the mode setting command is inserted in the form of one command into the process command string 55.

The operation of an information card in accordance with a second embodiment of the invention in which the command signal as shown in FIG. 4 is used will be explained with reference to the flowchart of FIG. 5. First, the trigger signal is received followed by the command signal in step S12. In step S13, the mode setting command is retrieved from the command signal. In step S14, if a determination is made that the mode setting command is not contained in the command signal, a mode code written in a predetermined region of the RAM 13 is read in step S15. In step S16, a determination is made whether or not this mode code is the passage mode. If the mode code is the passage mode, then in step S17, the place code 53 and the time code 54, both contained in the command signal, are compared with the place code 131 and the time code 132, both stored in the predetermined regions of the RAM 13 when the data is processed previously. In step S18, a determination is made whether or not the contents of the place and time codes at a given time agree with those of the place and time codes at a previous time. If the newly obtained contents do not agree with the old contents, then in step S19, the values of the place code 131 and the time code 132 stored in the RAM 13 are updated to the contents of the new place and time codes. In step S20, the process is then performed based on the process command string 55 contained in the command signal. In step S21, a response signal is output to the external unit. The process in steps S12 to S21 mentioned above is repeated until a determination is made that a sequence is completed in step S22. When the completion of the sequence is confirmed, the CPU 11 stops the operation of the clock generating circuit 29 in step S23, thus bringing the CPU 11 to a halt.

In step S14, if a determination is made that the mode setting command is contained in the command signal, a mode code specified by the mode setting command is written in a predetermined region of the RAM 13 in step S24. The flow logically proceeds to step S20, where the process is performed based on the process command string 55. Also, in step S16, if a determination is made that the mode code is not the passage mode, the flow logically proceeds to step S20, where the process is carried out based on the process command string 55. In step S18, if a determination is made that the contents of the new place and time codes agree with those of the old place and time codes, the process is not performed any longer for the subsequent process command string. The flow logically proceeds to step S23, where the operation of the CPU 11 is stopped.

Figure 5:
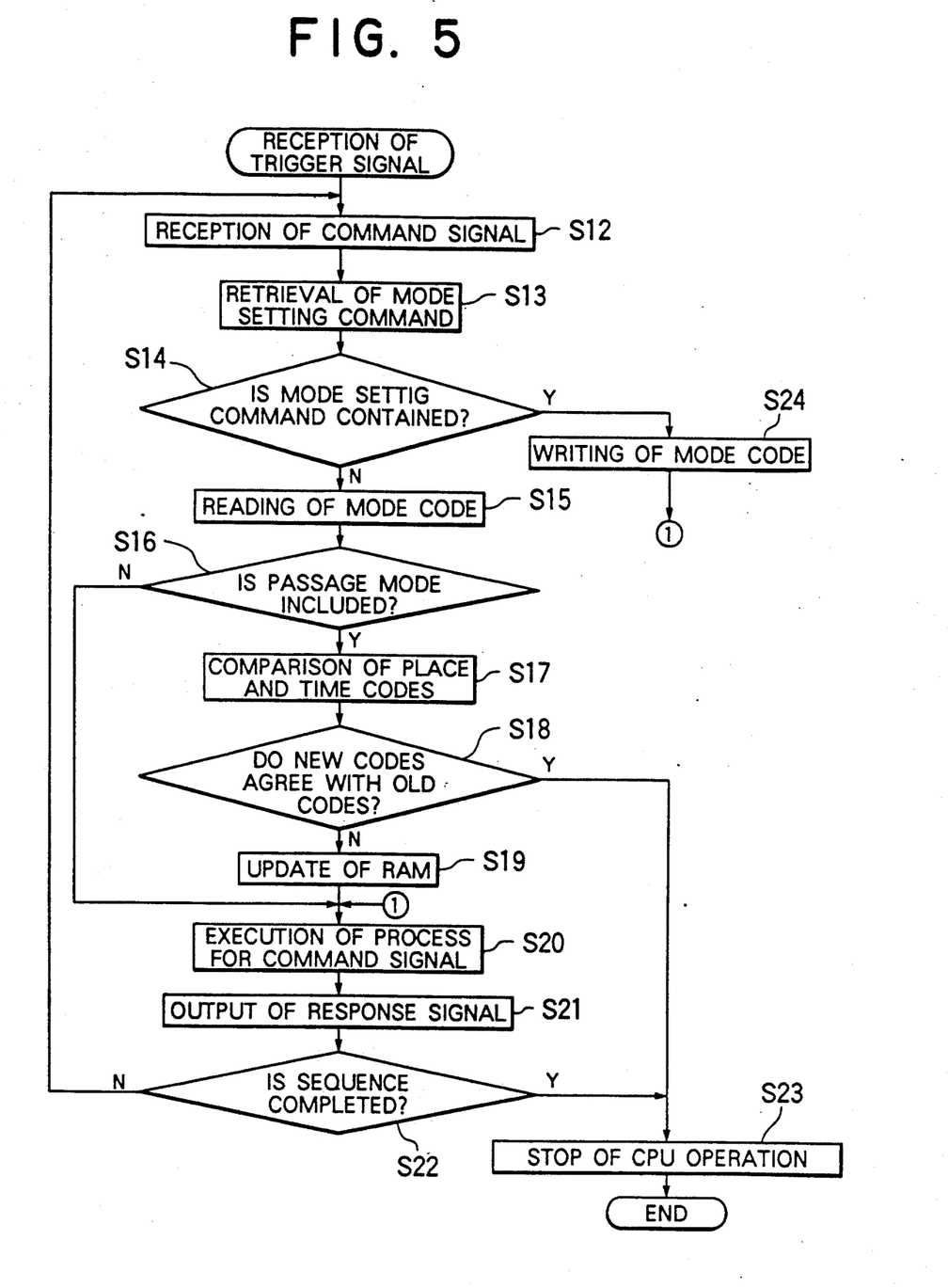
FIG. 5 is a flowchart showing the operation of the second embodiment.

When the command signal of the data format shown in FIG. 4 is used and a process shown in the flowchart of FIG. 5 is performed in accordance with the second embodiment, the length of the command signal shown in FIG. 4 is shorter than that of the command signal of FIG. 2 by the process mode command.

Figure 6:
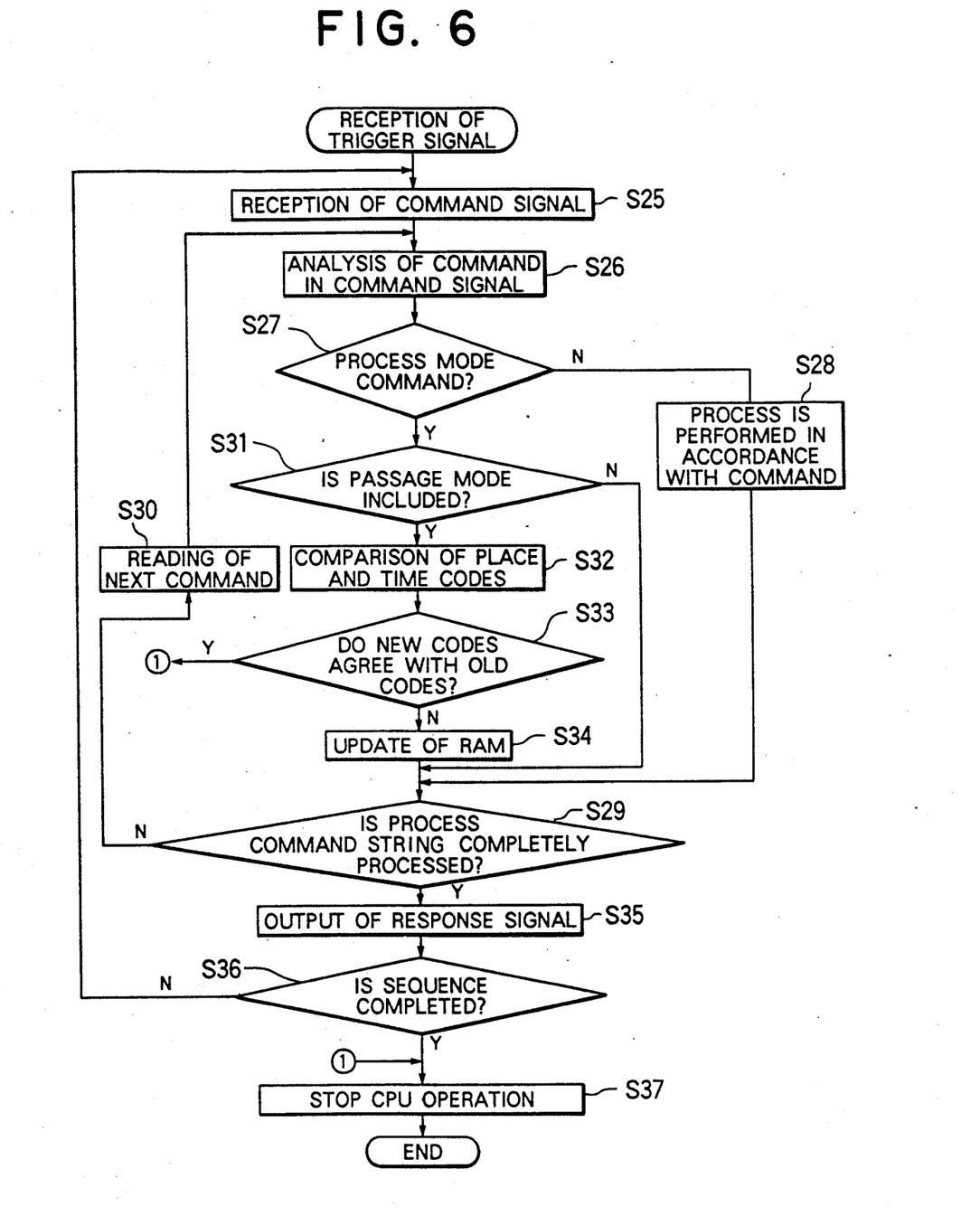
FIG. 6 is a flowchart showing the operation of a third embodiment.

The process mode command 43 is disposed before the process command string 46 in the data format of FIG. 2. Immediately after the command signal is received in step S1, the process mode command 43 is retrieved in step S2 of the flowchart of FIG. 3. However, retrieval of the process mode command 43 is not limited to such a time. The process mode command 43 may also be located in an appropriate position of the process command string 46, thereby being retrieved while the commands of the process command string 46 are being processed. The operation of an information card in accordance with a third embodiment of the invention designed in such a manner is shown in the flowchart of FIG. 6.

After the command signal has been received in step S25, a command in the command signal is analyzed in step S26. In step S27 if a determination is made that this command is not the process mode command, a process is performed in accordance with the command in step S28. In step S29 unless a determination is made that the whole process command string is completely processed, a next command is read in step S30. The flow logically returns to step S26. On the contrary, in step S27 if a determination is made that the command is the process mode command, then the process is performed for the passage mode in steps S31 to S34 in the same manner as in steps S4 to S7 of FIG. 3. In step S29 if a determination is made that the whole process command string is completely processed, a response signal is output in step S35; a determination is made as to whether or not a sequence is completed in step S36; and the operation of the CPU 11 is stopped in S37. The process in steps S35 to S37 is performed in the same manner as in steps S9 to S11 of FIG. 3.

Figure 7:
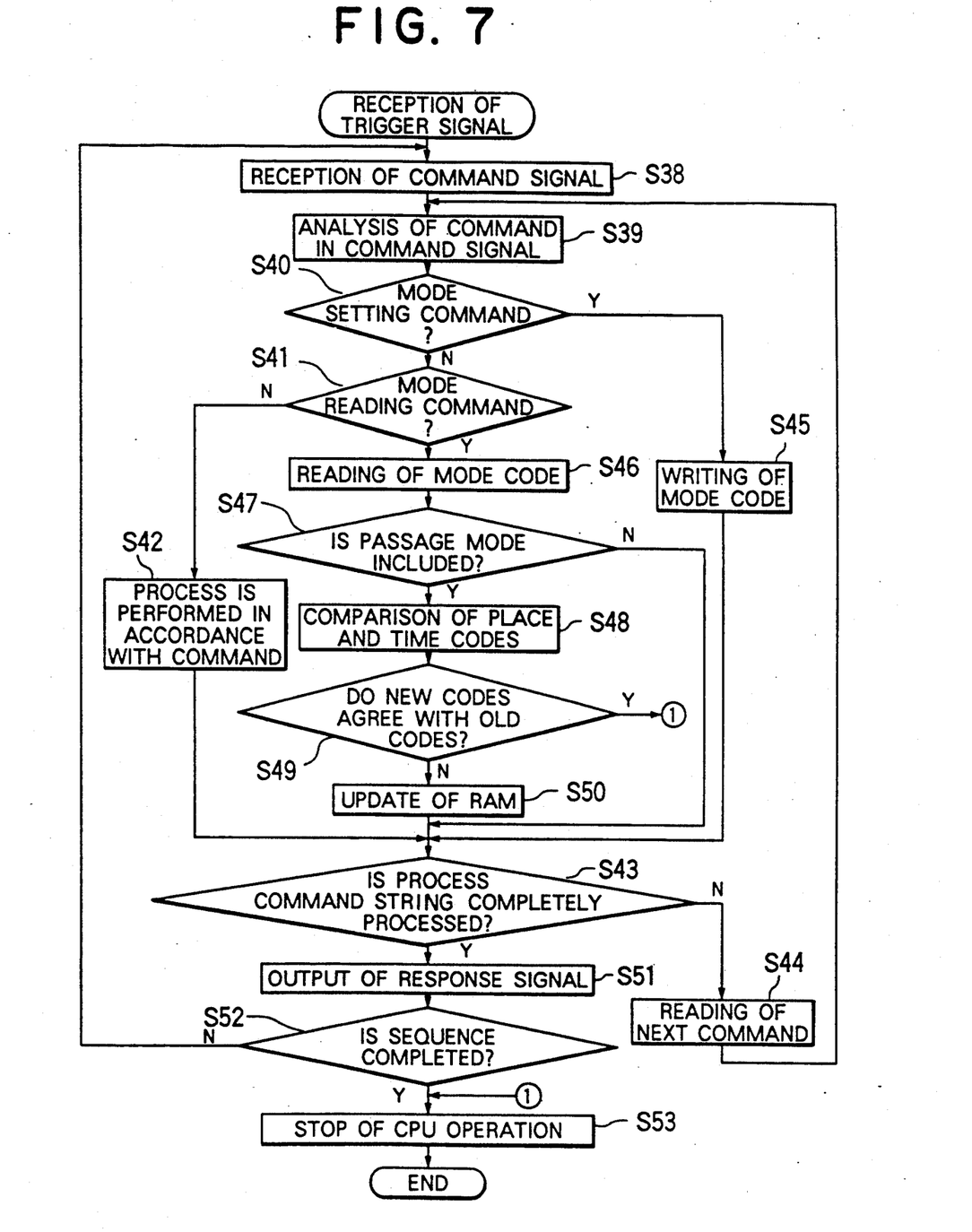
FIG. 7 is a flowchart showing the operation of a fourth embodiment.

The command signal of the data format shown in FIG. 4 may also be received in step S12 of the flowchart of FIG. 5. Immediately after this reception, a mode code is read to perform a process in accordance with this mode. Furthermore, a new mode reading command for reading a mode code may be set to retrieve the mode setting command while the commands of the process command string 55 are being processed. The flowchart of FIG. 7 shows the operation of an information card in accordance with a fourth embodiment of the invention in which such a mode reading command is used.

After the command signal has been received in step S38, a command in the command signal is analyzed in step S39. In step S40 if a determination is made that this command is not the mode setting command, a determination is made as to whether or not the command is the mode reading command in step S41. If the command is not the mode reading command, the process is performed in accordance with this command in step S42. In step S43 unless a determination is made that the whole process command string is completely processed, a next command is read in step S44. The flow logically returns to step S39. On the contrary, in step 40 if a determination is made that the command is the mode setting command, a mode code specified by the mode setting command is written in a predetermined region of the RAM 13. The flow logically proceeds to step S43. In step S41 if a determination is made that the command is the mode reading command, then the mode code is read in step S46, and the process is performed for the passage mode in steps S47 to S50 in the same manner as in steps S15 to S19 of FIG. 5. In step S43 if a determination is made that the whole process command string is completely processed, a response signal is output in step S51; a determination is made as to whether or not a sequence is completed in step S52; and the operation of the CPU 11 is stopped in S53. The processes in steps S51 to S53 are performed the same way as in steps S21 to S23 of FIG. 5.

Figure 8:
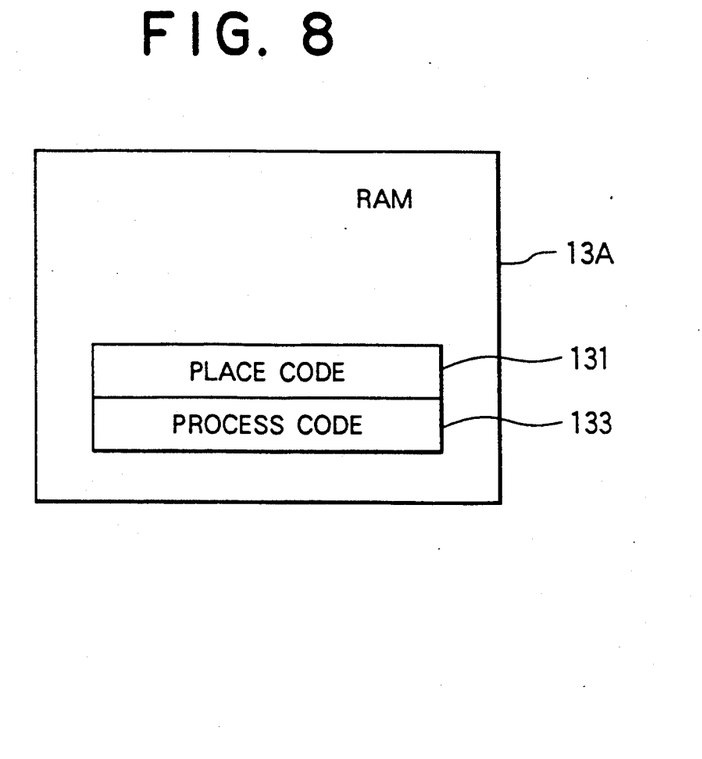
FIG. 8 is a block diagram showing a RAM used in a fifth embodiment.
Figure 9:
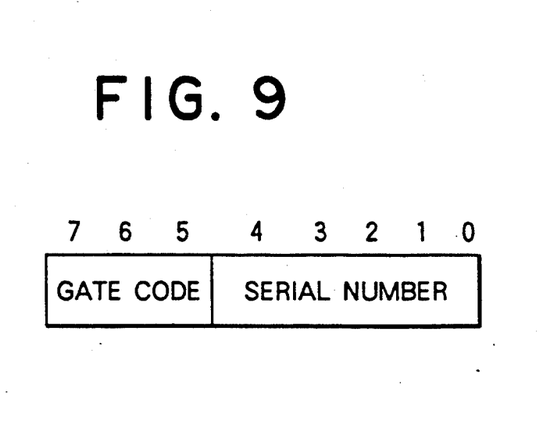
FIG. 9 is a view showing the data format of the place code used in the fifth embodiment.
Figure 10:
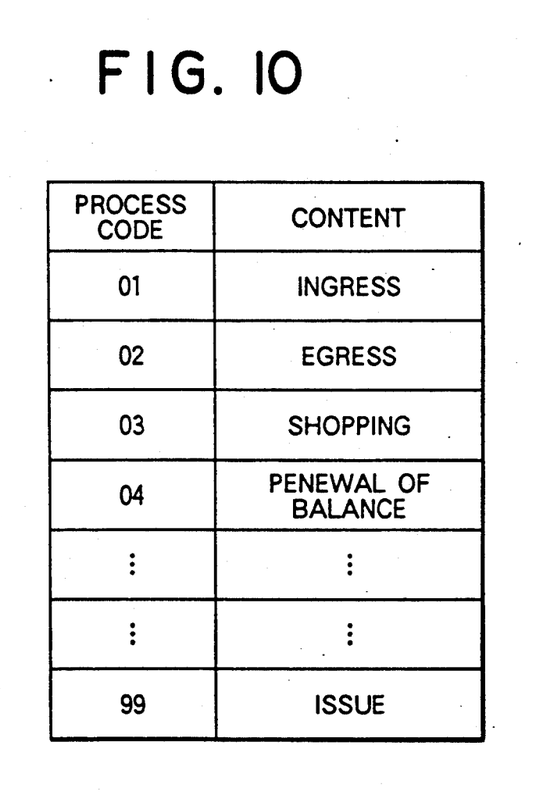
FIG. 10 is a view showing the relation between the process codes used in the fifth embodiment and the contents thereof.

FIG. 8 shows a RAM 13A for use with a non-contact type information card in accordance with a fifth embodiment. The RAM 13A stores in predetermined regions a place code 131, serving as first identification information, and a process code 133, serving as third identification information, both kinds of information being received from an external unit when a process has been performed previously. As shown in FIG. 9, the place code 131 includes a gate code indicating the gate where an external unit is installed, and a serial number indicating this external unit. As shown in FIG. 10, a process code 133 shows, according to the number of the place codes, the contents of various processes, such as an ingress process, an egress process, a shopping process, a renewal process and an issue process. In the fifth embodiment, at predetermined time intervals, external units send out to a signal-transmissible zone a trigger signal and a command signal including the place and process codes.

Figure 11:
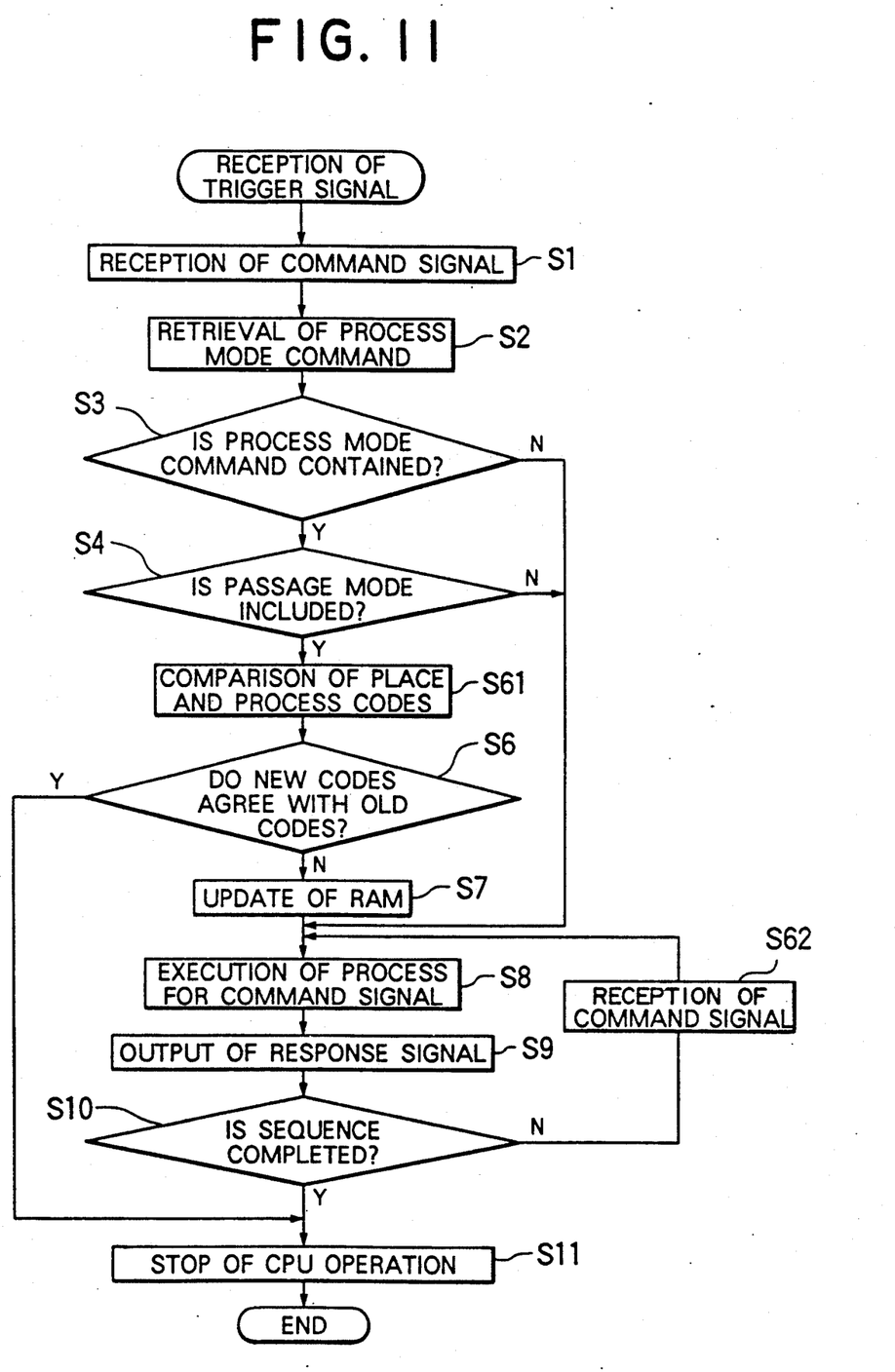
FIG. 11 is a flowchart showing the operation of the fifth embodiment.

The flowchart of FIG. 11 shows the operation of the information card according to the fifth embodiment. The fifth embodiment operates in a manner extremely similar to that of the first embodiment. The flowchart of FIG. 11 is the same as the flowchart of FIG. 3 for use in the first embodiment, except for steps S61 and S62.

First, the CPU 11 receives the trigger signal followed by a command signal in step S1, and retrieves the process mode command from the command signal in step S2. In step S3, if the process mode command is contained in the command signal, a determination is made whether or not the process mode command includes the passage mode in step S4. If the process mode command includes the passage mode, then in step S61, the place code and the process code, both contained in the command signal, are compared with the place code 131 and the process code 133, both stored in predetermined regions of the RAM 13A when the data has been processed previously.

In step S6, a determination is made as to whether or not the contents of the place and process codes at a given time agree with those of the place and process codes at a previous time. If the new contents do not agree with the old contents, then in step S7, the values of the place code 131 and the process code 133 both stored in the RAM 13A are updated to the new place and process codes. In step S8, the process is then performed based on the process command string contained in the command signal. In step S9, a response signal is output to the external unit. A determination is made that a sequence is completed in step S10. When it is determined that a sequence has not yet been completed, the flow logically proceeds to step S62, where a next command signal is received before returning to step S8. On the other hand, when the completion of the sequence is confirmed in step S10, the CPU 11 stops the operation of the clock generating circuit 29 in step S11, thus bringing the CPU 11 to a halt.

In step S6, if a determination is made that the contents of the new place and process codes agree with those of the old place and process codes, it is assumed that a required process has already been completed. The process is not performed any longer for the subsequent process command string. The flow logically proceeds to step S11, where the operation of the CPU 11 is stopped. If a determination is made that the process mode command is not contained in the command signal in step S3, or if the process mode command does not include the passage mode in step S4, the flow logically proceeds to step S8, where the process is carried out based on the process command string.

Thus, by collating the contents of the new place and process codes with those of the old place and process codes, it is possible to reliably perform only one operation.

In the same manner as in the first and fifth embodiments, it is also possible to perform only one operation by using a time code, serving as second identification information indicating process time, and a process code, serving as third identification information indicating the contents of a process. In this case, at predetermined time intervals, the external units send out to a signal-transmissible zone a trigger signal and a command signal including the time and process codes.

Figure 12:
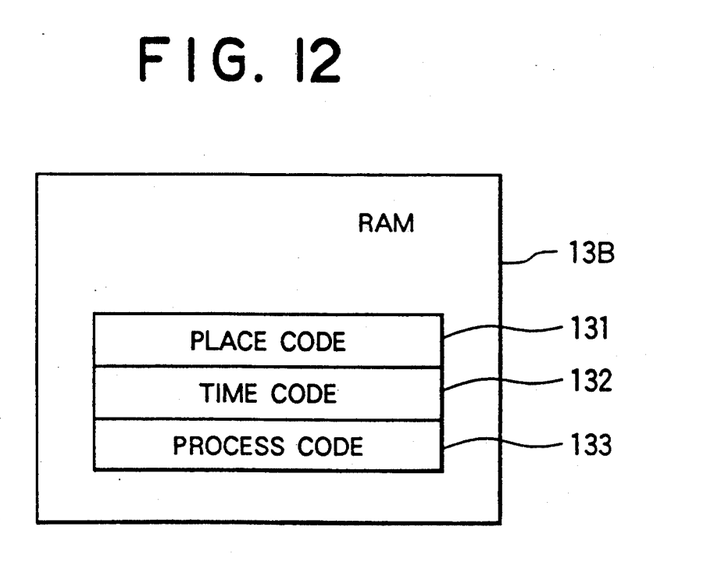
FIG. 12 is a block diagram showing a RAM used in a sixth embodiment.

The old first to third identification information, that is, the old place, time and process codes, are collated with the new place, time and process codes. It is possible to stop the data processing on the basis of the results of this collation. FIG. 12 shows a RAM 13B for use with a non-contact type information card in accordance with a sixth embodiment. The RAM 13B stores in predetermined regions a place code 131, serving as first identification information, a time code 132, serving as second identification information, and a process code 133, serving as third identification information, all information being received from an external unit when a process has been performed previously. In the sixth embodiment, at predetermined time intervals, external units send out to a signal-transmissible zone a trigger signal and a command signal including the place, time and process codes.

Figure 13:
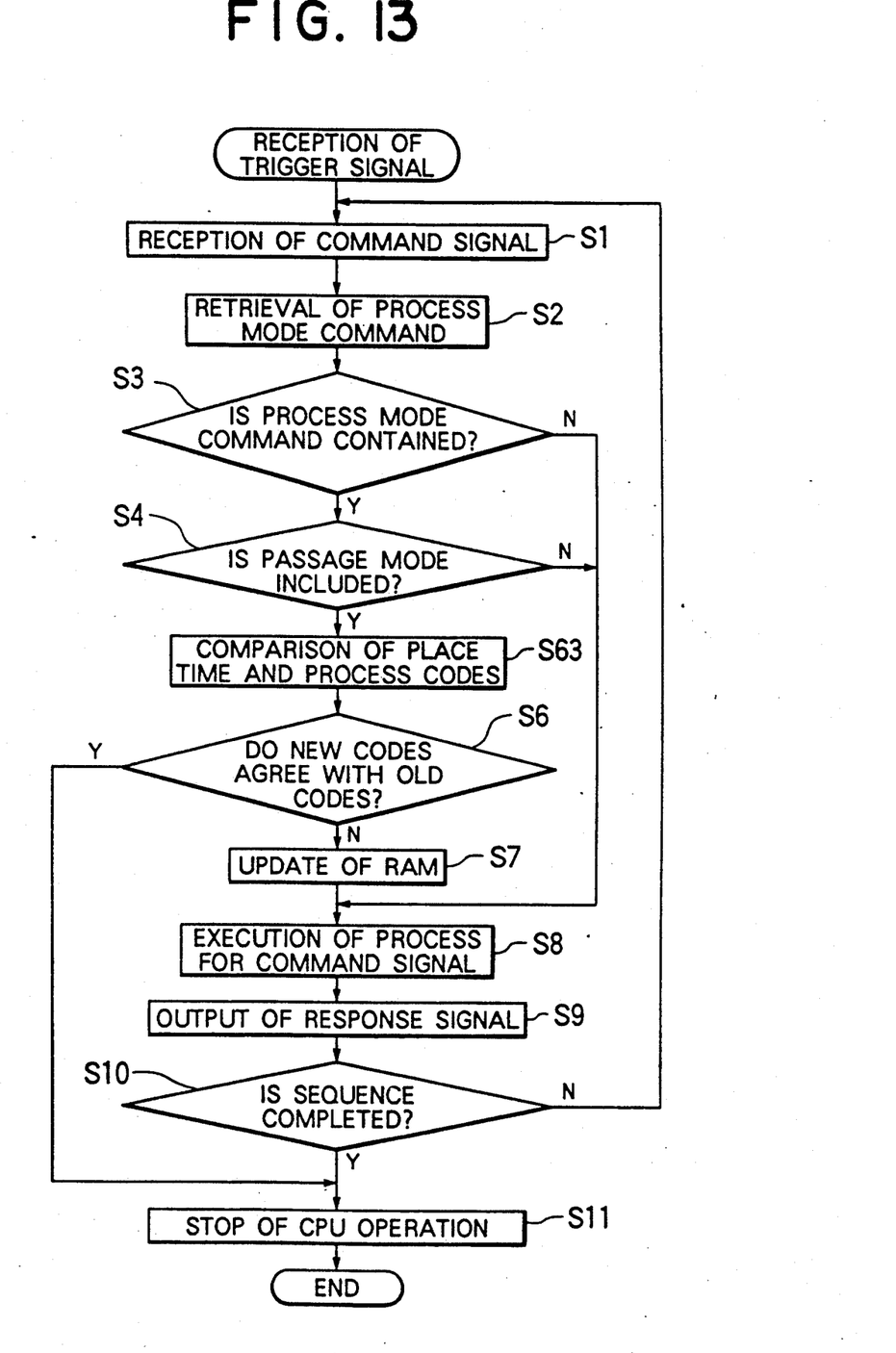
FIG. 13 is a flowchart showing the operation of the sixth embodiment.

The flowchart of FIG. 13 shows the operation of the information card according to the sixth embodiment. The sixth embodiment operates in a manner similar to that of the first embodiment. The flowchart of FIG. 13 is the same as the flowchart of FIG. 3 for use in the first embodiment, except for step S63.

First, the CPU 11 receives the trigger signal followed by a command signal in step S1, and retrieves the process mode command from the command signal in step S2. In step S3, if the process mode command is contained in the command signal, a determination is made whether or not the process mode command includes the passage mode in step S4. If the process mode command includes the passage mode, then in step S63, the place code, the time code and the process code, all contained in the command signal, are compared with the place code 131, the time code 132 and the process code 133, all stored in predetermined regions of the RAM 13B when the data has been processed previously.

In step S6, a determination is made as to whether or not the contents of the place, time and process codes at a given time agree with those of the place, time and process codes at a previous time. If the new contents do not agree with the old contents, then in step S7, the values of the place code 131, the time code 132 and the process code 133, all stored in the RAM 13B, are updated to the new place, time and process codes. In step S8, the process is then performed based on the process command string contained in the command signal. In step S9, a response signal is output to the external unit. A determination is made that a sequence is completed in step S10. When it is determined that a sequence has not yet been completed, the flow logically returns to step S1. On the other hand, when the completion of the sequence is confirmed in step S10, the CPU 11 stops the operation of the clock generating circuit 29 in step S11, thus bringing the CPU 11 to a halt.

In step S6, if a determination is made that the contents of the new place, time and process codes agree with those of the old place, time and process codes, it is assumed that a required process has already been completed. The process is not performed any longer for the subsequent process command string. The flow logically proceeds to step S11, where the operation of the CPU 11 is stopped. If a determination is made that the process mode command is not contained in the command signal in step S3, or if the process mode command does not include the passage mode in step S4, the flow logically proceeds to step S8, where the process is carried out based on the process command string.

Thus, by collating the contents of the new place, time and process codes with those of the old place, time and process codes, it is possible to reliably perform only one operation.

What is claimed is:

1. A non-contact type information card comprising:
   data transmitting and receiving means for transmitting data to and receiving data from a plurality of external units without direct contact;
   data processing means for processing data based on command signals sequentially received by said data transmitting and receiving means, each command signal including first identification information identifying one of the external units and second identification information identifying time;
   storing means for storing the first and second identification information of a first command signal;
   determining means for determining, when said data transmitting and receiving means receives a second command signal, whether the first and second identification information of the second command signal agree with the first and second identification information of the first command signal stored in said storing means;
   stopping means for stopping, when said determining means determines that the first and second identification information of the second command signal agree with the first and second identification information of the first command signal, said data processing means until said data transmitting and receiving means receives another command signal; and
   updating means for updating, when said determining means determines that the first and second identification information of the second command signal does not agree with the first and second identification information of the first command signal, said storing means by storing the first and second identification information of the second command signal.

2. A non-contact type information card comprising:
   data transmitting and receiving means for transmitting data to and receiving data from a plurality of external units without direct contact;
   data processing means for processing data based on command signals sequentially received by said data transmitting and receiving means, each command signal including first identification information identifying one of the external units and third identification information identifying a process;
   storing means for storing the first and third identification information of a first command signal;
   determining means for determining, when said data transmitting and receiving means receives a second command signal, whether the first and third identification information of the second command signal agree with the first and second identification information of the first command signal stored in said storing means;

stopping means for stopping, when said determining means determines that the first and third identification information of the second command signal agree with the first and third identification information of the first command signal, said data processing means until said data transmitting and receiving means receives another command signal; and updating means for updating, when said determining means determines that the first and third identification information of the second command signal does not agree with the first and third identification information of the first command signal, said storing means by storing the first and third identification information of the second command signal.

3. A non-contact type information card comprising:

data transmitting and receiving means for transmitting data to and receiving data from a plurality of external units without direct contact;

data processing means for processing data based on command signals sequentially received by said data transmitting and receiving means, each command signal including second identification information identifying process time and third identification information identifying a process;

storing means for storing the first and third identification information of a first command signal;

determining means for determining, when said data transmitting and receiving means receives a second command signal, whether the second and third identification information of the second command signal agree with the first and third identification information of the first command signal stored in said storing means;

stopping means for stopping, when said determining means determines that the second and third identification information of the second command signal agree with the second and third identification information of the first command signal, said data processing means until said data transmitting and receiving means receives another command signal; and updating means for updating, when said determining means determines that the second and third identification information of the second command signal does not agree with the second and third identification information of the first command signal, said storing means by storing the second and third identification information of the second command signal.

4. A non-contact type information card comprising:

data transmitting and receiving means for transmitting data to and receiving data from a plurality of external units without direct contact;

data processing means for processing data based on command signals sequentially received by said data transmitting and receiving means, each command signal including first identification information identifying one of the external units and second identification information identifying time, and third identification information identifying a process;

storing means for storing the first, second, and third identification information of a first command signal;

determining means for determining, when said data transmitting and receiving means receives a second command signal, whether the first, second, and third identification information of the second command signal agree with the first, second, and third identification information of the first command signal stored in said storing means;

stopping means for stopping, when said determining means determines that the first, second, and third identification information of the second command signal agree with the first, second, and third identification information of the first command signal, said data processing means until said data transmitting and receiving means receives another command signal; and updating means for updating, when said determining means determines that the first, second, and third identification information of the second command signal does not agree with the first, second, and third identification information of the first command signal, said storing means by storing the first, second, and third identification information of the second command signal.

5. A communication system comprising:

a plurality of external units installable in different locations having respective signal-transmissible zones not interfering with each other for transmitting at predetermined time intervals command signals, each command signal including a time code identifying the time and a place code identifying the location in which the respective external unit is installed; and a non-contact type information card for receiving the command signals from said plurality of external units and for processing data in response to a received command signal, said non-contact type information card receiving the command signal from any one of said external units within the respective signal-transmissible zone of the corresponding external unit, comparing the time and place codes of the command signal received with time and place codes of a command signal received previously, and, when the new time and place codes agree with the old time and place codes, stopping the data processing until a next command signal is received.

6. A communication system as claimed in claim 5 wherein said plurality of external units are disposed at an entrance gate and an exit gate of an area.

7. A communication system comprising:

a plurality of external units installable in different locations having respective signal-transmissible zones not interfering with each other for transmitting at predetermined time intervals command signals, each command signal including a place code identifying the location in which the respective external unit is installed and a process code identifying a data process; and a non-contact type information card for receiving the command signals from said plurality of external units and for processing data in response to a received command signal, said non-contact type information card receiving the command signal from any one of said external units within the respective signal-transmissible zone of the corresponding external unit, comparing the time and place codes of the command signal received with time and place codes of a command signal received previously, and, when the new place and process codes agree with the old place and process codes, stopping the data processing until a next command signal is received.

8. A communication system as claimed in claim 7 wherein said plurality of external units are disposed at an entrance gate and an exit gate of an area.

9. A communication system comprising:
a plurality of external units installable in different locations having respective signal-transmissible zones not interfering with each other for transmitting at predetermined time intervals command signals, each command signal including a time code and a process code identifying the data process; and
a non-contact type information card for receiving the command signals from said plurality of external units and for processing data in response to a received command signal, said non-contact type information card receiving the command signal from any one of said external units within the respective signal-transmissible zone of the corresponding external unit, comparing the time and process codes of the command signal received with time and process codes of a command signal received previously, and, when the new time and process codes agree with the old time and process codes, stopping the data processing until a next command signal is received.

10. A communication system as claimed in claim 9 wherein said plurality of external units are disposed at an entrance gate and an exit gate of an area.

11. A communication system comprising:
a plurality of external units installable in different locations having respective signal-transmissible zones not interfering with each other for transmitting at predetermined time intervals command signals, each command signal including a time code identifying the time, a place code identifying the location in which the respective external unit is installed, and a process code identifying a data process; and
a non-contact type information card for receiving the command signals from said plurality of external units and for processing data in response to a received command signal, said non-contact type information card receiving the command signal from any one of said external units within the respective signal-transmissible zone of the corresponding external unit, comparing the time, place, and process codes of the command signal received with time, place, and process codes of a command signal received previously, and, when the new time and process codes agree with the old time, place, and process codes, stopping the data processing until a next command signal is received.

12. A communication system as claimed in claim 11 wherein said plurality of external units are disposed at an entrance gate and an exit gate of an area.

* * * * *